United States Patent
Takaichi et al.

(10) Patent No.: US 6,750,331 B1
(45) Date of Patent: Jun. 15, 2004

(54) OLIGOSACCHARIDE-SUPPLYING COMPOSITIONS

(75) Inventors: Akihisa Takaichi, Naruto (JP); Toshihiko Okamoto, Tokushima (JP); Toshiaki Matsumoto, Tokushima (JP); Takuya Kishimoto, Tokushima (JP)

(73) Assignee: Otsuka Pharmaceutical Co., Ltd., Tokyo (JP)

( * ) Notice: Subject to any disclaimer, the term of this patent is extended or adjusted under 35 U.S.C. 154(b) by 844 days.

(21) Appl. No.: 10/019,197

(22) PCT Filed: Jun. 20, 2000

(86) PCT No.: PCT/JP00/03998

§ 371 (c)(1), (2), (4) Date: Dec. 31, 2001

(87) PCT Pub. No.: WO01/00883

PCT Pub. Date: Jan. 4, 2001

(30) Foreign Application Priority Data

Jun. 30, 1999 (JP) ............................................. 11-184814

(51) Int. Cl.⁷ ............................ C07H 3/00; A61K 9/20; A61K 9/46; A61K 3/715; A61K 9/36

(52) U.S. Cl. .................... 536/1.11; 536/123.1; 536/4.1; 424/464; 424/465; 424/466

(58) Field of Search ................................. 536/1.11, 4.1, 536/123.1; 424/464, 465, 466

(56) References Cited

U.S. PATENT DOCUMENTS 5,164,192 A  *  11/1992  Louwes
5,707,654 A  *   1/1998  Beres et al.

\* cited by examiner

*Primary Examiner*—Samuel Barts
*Assistant Examiner*—Michael C. Henry
(74) *Attorney, Agent, or Firm*—Sughrue Mion, PLLC

(57) ABSTRACT

The present invention provides an oligosaccharide-supplying composition which contains 10 to 80% by weight of oligosaccharide, 0.3 to 10% by weight of a foaming component and 0.9 to 30% by weight of a neutralizing component and is in the form of foaming chewable tablets. The composition is highly useful in practice, has a uniform composition, excellent texture and high stability and can be easily taken.

13 Claims, No Drawings

OLIGOSACCHARIDE-SUPPLYING COMPOSITIONS

This application the National Phase of PCT/JP00/03998 filed Jun. 20, 2000.

DESCRIPTION

1. Technical Field

The present invention relates to an oligosaccharide-supplying composition, more specifically to an oligosaccharide-supplying composition with a high oligosaccharide content, which has improved texture and high stability and is in the form of foaming chewable tablets.

2. Background Art

Oligosaccharides are known to have low digestability, usually reaching the large intestine in an undigested state and are utilized by enterobacteria. It is also known that oligosaccharides balance the intestinal environment and are especially effective in increasing *Lactobacillus bifidus* levels. The minimum required intake of oligosaccharides to achieve these effects is usually about 0.7 to 10 g per day, although it may slightly vary depending on the type of oligosaccharide.

Most oligosaccharides are amorphous and are mixtures of a plurality of carbohydrates. Therefore, the moisture absorption of oligosaccharides is about several times higher than that of sugar. Thus it is also known that compositions with higher oligosaccharide content have poor texture and lower stability.

Commercially available oligosaccharides are generally in the form of powders of syrups. Oligosaccharides are rarely taken in these commercially available forms and usually made into suitable preparations such as powders, tablets (chewables), etc. Such preparations of oligosaccharides, however, have the drawback of sticking to teeth during ingestion. Another disadvantage is that such preparations of oligosaccharides form a solid lump comparatively rapidly because of their high hygroscopicity. In view of texture and stability, most preparations containing oligosaccharides have been formed into beverages free of the above problems.

Thus, known oligosaccharide-containing preparations are usually unsuitable for ingestion or administration in an amount sufficient to produce their intrinsic effect of balancing the intestinal environment. Further improvement is still needed with respect to the form of preparation, texture, stability and ease of ingestion and administration.

DISCLOSURE INVENTION

An object of the present invention is to provide an improved oligosaccharide-supplying preparation that can replace conventional oligosaccharide-containing preparations, is highly advantageous in use, has a uniform dispersion of components in preparation, excellent texture and high stability and can be easily taken.

The inventors carried out intensive research to achieve the above object and found the following: foaming chewable tablets of the preparation easily disintegrate and is highly soluble in the mouth during ingestion or administration, so that sticking to teeth during chewing of the preparation can be prevented, thus providing an improved oligosaccharide-supplying preparation free of reduced texture and allowing one to enjoy its taste by licking or chewing it without needing water. The present invention was accomplished based on this finding.

The present invention provides an oligosaccharide-supplying composition comprising 10 to 80% by weight of oligosaccharide, 0.3 to 10% by weight of a foaming component and 0.9 to 30% by weight of a neutralizing component, and being in the form of foaming chewable tablets.

The present invention provides the above oligosaccharide-supplying composition further comprising 0.1 to 5 wt. % of potassium carbonate as stabilizer; the above composition further comprising 5 to 20 wt. % of water-insoluble dietary fiber; the above composition wherein the oligosaccharide is lactosucrose; the above composition having an oligosaccharide content of 30 to 75 wt. %; the above composition wherein the oligosaccharide is at least one member selected from the group consisting of lactosucrose, palatinose oligosaccharide, isomaltooligosaccharide, xylooligosaccharide, fructooligosaccharide, lactulose, galactooligosaccharide, gentiooligosaccharide, chitin oligosaccharide, soybean oligosaccharide, panose, cellooligosaccharide, pectin oligosaccharide, inulooligosaccharide, levanoligosaccharide, mannooligosaccharide, chitooligosaccharide and coupling sugar; the above composition wherein the oligosaccharide is at least one member selected from the group consisting of lactosucrose, palatinose oligosaccharide, isomaltooligosaccharide, xylooligosaccharide, fructooligosaccharide, lactulose, galactooligosaccharide and soybean oligosaccharide; the above composition wherein the oligosaccharide is lactosucrose; the above composition wherein the foaming component is at least one member selected from the group consisting of sodium hydrogencarbonate, sodium carbonate and calcium carbonate; the above composition wherein the neutralizing component is at least one member selected from the group consisting of citric acid, L-tartaric acid, L-ascorbic acid and DL-malic acid; the above composition wherein the neutralizing component is at least one member selected from the group consisting of L-ascorbic acid and anhydrous citric acid; the above composition wherein the water-insoluble dietary fiber is at least one member selected from the group consisting of crystalline cellulose, wheat bran, oat bran, cone fiber, soy fiber and beet fiber; and the above composition wherein the water-insoluble dietary fiber is crystalline cellulose.

Foaming chewable tablets of the composition of the present invention disintegrate and dissolve at a moderate rate in the mouth to thereby prevent binding due to the hygroscopic property intrinsic to oligosaccharides, i.e., sticking to teeth in the mouth, thus allowing one to enjoy its taste by licking or chewing it without water and concurrently realizing sufficient supply and absorption of oligosaccharides in the body through the ingestion.

The composition of the invention further containing the specified amount of potassium carbonate as a stabilizer can prevent an unnecessary reaction between the neutralizer and the foaming agent (caused by the presence of water) before ingestion of the composition and can ensure a sufficient foaming reaction during ingestion. That is, potassium carbonate acts as a desiccant.

The composition of the invention further containing the specified amount of water-insoluble dietary fiber has the advantage that even a considerable increase of oligosaccharide content does not adversely affect its texture and stability in a significant manner.

The composition of the invention additionally containing a sucrose fatty acid ester, powder sugar, fruit juice powder and flavoring material achieves further improved shape retention of tablets and better taste.

It is essential to use oligosaccharide in the present invention. Preferably used are oligosaccharides that increase bifidobacteria levels. Usable oligosaccharides, however, are not limited thereto and all oligosaccharides can be used that are hygroscopic and have the problem that preparations containing them stick to teeth, etc. The term "oligosaccharides that increase bifidobacteria levels" herein used is defined as those that are essential and important nutrient (sugar source) for intestinal growth of *Lactobacillus bifidus* and consist of 2 to 10 monosaccharides which are substantially undigested with human digestive enzymes and not absorbed by human or utilized by enterobacteria other than *Lactobacillus bifidus* (i.e., which are selectively utilized by *Lactobacillus bifidus*). A variety of known oligosaccharides may be used in the present invention. Specific examples include lactosucrose, palatinose oligosaccharide, isomaltooligosaccharide, xylooligosaccharide, fructooligosaccharide, lactulose, galactooligosaccharide, gentiooligosaccharide, chitin oligosaccharide, soybean oligosaccharide, panose, cellooligosaccharide, pectin oligosaccharide, inulooligosaccharide, levanoligosaccharide, mannooligosaccharide, chitooligosaccharide, coupling sugar and the like. Preferable among them are lactosucrose, palatinose oligosaccharide, isomaltooligosaccharide, xylooligosaccharide, fructooligosaccharide, lactulose, galactooligosaccharide and soybean oligosaccharide. Especially preferred is lactosucrose. These oligosaccharides may be used in mixtures of two or more.

Generally, commercially available oligosaccharides are mainly natural by-products, hydrolysates obtained from the hydrolysis of polysaccharides with enzymes, polymerization products obtained from the transition and condensation reactions of saccharides with enzymes, isomerization and reduction products of saccharides and the like. Commercially available oligosaccharides may contain unreacted products or by-products of the reactions. In the present invention, oligosaccharides are advantageously used in the form of such mixtures as they are, i.e., in the form of commercially available oligosaccharides.

Examples of production processes and compositions of oligosaccharide mixtures are described below.

For example, the lactosucrose-containing mixture can be obtained by an enzymatic reaction of lactose and sugar. The mixture contains 55 wt. % or more of lactosucrose as a main component and further contains lactose, etc.

The palatinose oligosaccharide-containing mixture can be obtained by a partial condensation of palatinose obtained by an enzyme reaction of sugar. The mixture contains 45 wt. % or more of palatinose oligosaccharide as a main component and further contains palatinose, etc.

The isomaltooligosaccharide-containing mixture can be obtained by an enzymatic treatment of starch. The mixture contains 85 wt. % or more of isomaltooligo-saccharide and further contains glucose, maltose, etc.

The xylooligosaccharide-containing mixture can be obtained by an enzymatic treatment of vegetable fibers (xylan) such as cottonseed hulls. The mixture contains 95 wt. % or more of xylooligosaccharide as a main component.

The fructooligosaccharide-containing mixture can be obtained by an enzymatic treatment of sugar. The mixture contains 95 wt. % or more of fructooligosaccharide as a main component and further contains sugar, etc.

The lactulose-containing mixture can be obtained by isomerization of lactose. The mixture contains 97 wt. % or more of lactulose as a main component and further contains galactose, etc.

The galactooligosaccharide-containing mixture can be obtained by an enzymatic treatment of lactose. The mixture contains 55 to 70 wt. % or more of galactooligosaccharide as a main component and further contains lactose, etc.

The soybean oligosaccharide-containing mixture can be obtained by separation of sugar containing-component from soybeans and refining. The mixture contains over 10 wt. % of stachyose and raffinose.

Preferably, the proportion of oligosaccharide in the composition of the invention is 10 to 80 wt. %, more preferably 30 to 75 wt. %. If the proportioin is less than 10 wt. %, the oligosaccharide content of each chewable tablet is too low, resulting in difficulty achieving its bifidobacteria multiplication effect and losing commercial value, hence advantageous. On the other hand, if the proportion is more than 80 wt. %, the proportions of the components other than oligosaccharide are reduced. For example, reduced amounts of the foaming component and neutralizing component do not produce the desired foaming property and fail to provide chewable tablets with improved texture, thus being disadvantageous.

The composition of the invention essentially contains the specified amounts of a foaming component and a neutralizing component in addition to the oligosaccharide. The foaming component to be used may be selected from potassium hydrogencarbonate, sodium hydrogencarbonate, sodium carbonate, magnesium carbonate and calcium carbonate, more preferably from sodium hydrogencarbonate, sodium carbonate and calcium carbonate. These may be used singly or in combinations of two or more.

The neutralizing component to be used is an acidic compound capable of neutralizing the foaming component to generate carbon dioxide gas. Specific examples of the acidic compounds include organic acids such as citric acid, L-tartaric acid, fumaric acid, L-ascorbic acid, gluconic acid, acetic acid, lactic acid, DL-malic acid and the like. Preferred are citric acid (anhydrous citric acid), L-tartaric acid, L-ascorbic acid and DL-malic acid. Especially preferred are L-ascorbic acid and anhydrous citric acid.

The proportion of the foaming component in the composition of the invention is preferably from 0.3 to 10 wt. % and the proportion of the neutralizing component from 0.9 to 30 wt. %. If the composition contains less than 0.3 wt. % of the foaming component, the resulting chewable tablets will not properly disintegrate and thus the desired adhesion inhibitory effect is not achieved. On the other hand, if the proportion of the foaming component is more than 10 wt. %, the resulting chewable tablets tend to create excessive foaming and are unpleasant to eat. If the composition contains less than 0.9 wt. % of the neutralizing component, the foaming component will not be sufficiently neutralized, resulting in poor foaming properties, a failure to achieve the desired adhesion inhibitory effect, and an insufficiently acidic taste. On the other hand, if the proportion of the neutralizing component is more than 30 wt. %, the resulting chewable tablets are too sour and taste unpleasant. Especially preferable proportions are about 0.6 to about 3 wt. % of the foaming agent and about 2 to about 10 wt. % of the neutralizing agent.

More advantageously, the composition of the invention contains 0.1 to 5 wt. % of potassium carbonate as a stabilizer. Potassium carbonate in such a proportional range does not adversely affect the taste of the composition and is effective in retaining the foaming properties of the composition of the invention.

Preferably, the composition of the invention further contains 5 to 20 wt. % of water-insoluble dietary fiber. "Water-insoluble dietary fiber" herein means water-insoluble food substances which are hard to digest and are not hydrolyzed with human digestive enzymes. Specific examples thereof include crystalline cellulose, wheat bran, oat bran, cone fiber, soy fiber and beet fiber. These water-insoluble dietary fibers may be used slightly or in combinations of two or more. Combined use is advantageous because cost reduction can be achieved by partial substitution of a low-price material for a high-price material. These water-insoluble dietary fibers can enhance the desired sticking inhibitory effect of the composition to teeth during ingestion. Water-insoluble dietary fiber, however, does not completely dissolve in the mouth. Therefore, if the proportion of the water-insoluble dietary fiber is much more than 20 wt. %, powdery taste will result. Thus a large amount of water-insoluble dietary fiber is not desirable.

The composition of the invention may optionally contain, in addition to the essential components, additive components selected from various known additives. Such additives include, for example, saccharides (excluding oligosaccharides), sugar alcohols, sweeteners and like excipients, binders, disintegrators, lubricants, thickeners, surfactants, electrolytes, flavorings, coloring agents, pH modifiers, fluidity improvers and the like. Specific examples of the additives include wheat starch, potato starch, corn starch, dextrin and like starches; sucrose, glucose, fructose, maltose, xylose, lactose and like saccharides (excluding oligosaccharides); sorbitol, mannitol, maltitol, xylitol and like sugar alcohols; calcium phosphate, calcium sulfate and like excipients; starch, saccharides, gelatine, gum arabic, dextrin, methyl cellulose, polyvinylpyrrolidone, polyvinyl alcohol, hydroxypropylcellulose, xanthan gum, pectin, gum tragacanth, casein, alginic acid and like binders and thickeners; leucine, isoleucine, L-valine, sugar esters, hardened oils, stearic acid, magnesium stearate, talc, macrogols and like lubricants; CMC, CMC-Na, CMC-Ca and like disintegrators; polysorbate, lecithin and like surfactants; aspartame, alitame and like dipeptides; silicon dioxide and like fluidity improvers; and stevia, saccharin and like sweeteners. The amounts of these additives can be properly selected based on their relation to the essential components and properties of the preparation, production method, etc.

The preparation of the invention may further contain a suitable amount of vitamins. Such vitamins include L-ascorbic acid (vitamin C) used as a neutralizer as mentioned above.

The composition of the invention can be produced according to conventional manufacturing techniques for preparations. For example, foaming tablets of the preparations of the invention can be produced by weighing and mixing the specified amounts of the components and subjecting the mixture to direct powder compression, dry or wet granule compression or the like.

The resulting foaming chewable tablets of the invention are orally taken. Preferably, the dose is such that several chewable tablets of the invention, each weighing about 0.5 to 6 g, are taken.

The composition of the invention is, like known chewable tablets, shaped into a form suitable for mastication in the mouth or being taken with water.

The present invention provides a novel oligosaccharide-supplying composition in the form of foaming chewable tablets. The foaming chewable tablets have excellent storage stability, readily disintegrate in the mouth and can be easily ingested or administered, thus being advantageous. Another advantageous characteristic is that the composition of the invention realizes sufficient, safe supply and absorption of oligosaccharides in the body through ingestion so that the oligosaccharides can regulate the functions of the intestines. A further characteristic is that the composition of the invention tastes good and has a fresh, mild taste.

BEST MODE FOR CARRYING OUT THE INVENTION

Examples are given below to illustrate the present invention in more detail. In the Examples, the parts and percentages are all by weight unless otherwise specified.

Examples 1–21

Oligosaccharides, other saccharides and water-insoluble dietary fiber in the amounts specified in tables 1–4 below were placed in a stirring mixer (Mitsui Henshell Mixer FM20C/I, manufactured by Mitsui Mining Company, Limited) and mixed. Several percent of a combination of water and ethanol was added and the resulting mixture was wet granulated.

The granules thus obtained were vacuum dried using a vacuum drying oven, manufactured by Tabai Espec Corp.). The granules were passed through a No. 16 sieve. Then the specified amounts of the neutralizing component, foaming component, powdered fruit juice, potassium carbonate and flavor and sucrose fatty acid ester used as lubricant, were added and mixed. The mixture was compressed using a rotary compressor (RT-S20-25K-A, manufactured by Kikusui Electronics Corp.) to give foaming chewable tablets of the oligosaccharide-supplying composition of the invention.

TABLE 1

| Components | Example No. | | | | | |
|---|---|---|---|---|---|---|
| (wt. %) | 1 | 2 | 3 | 4 | 5 | 6 |
| Oligosaccharides | 66 | 70 | 63 | 56 | 70 | 71 |
| Isomaltooligosaccharide | 56 | 60 | — | — | — | — |
| Galactooligosaccharide | — | — | 44 | — | — | — |
| Fructooligosaccharide | — | — | — | 39 | 67 | — |
| Paratinose oligosaccharide | — | — | — | — | — | 32 |
| Neutralizing component | | | | | | |
| L-ascorbic acid | 5 | — | 2 | 2 | 4 | 4 |
| Anhydrous citric acid | — | 3 | 2 | 2 | — | — |
| Foaming component | | | | | | |
| Sodium hydrogencarbonate | 2 | 1 | 1 | 1 | 1 | 1 |
| Sodium carbonate | — | — | 1 | — | — | — |
| Calcium carbonate | — | — | — | — | — | 2 |
| Sucrose fatty acid ester | 1 | 1 | 2 | 1 | 1 | 1 |
| Powdered sugar | 7 | 2 | 5 | 18 | — | — |
| Water-insoluble dietary fiber | | | | | | |
| Crystalline cellulose | 13 | 18 | 20 | 15 | 20 | 16 |
| Fruit juice powder | 3 | 3 | 2 | 3 | 2 | 3 |
| Potassium carbonate | 0.5 | 0.2 | 0.3 | 0.2 | 0.2 | 0.2 |
| Flavor | q.s. | q.s. | q.s. | q.s. | q.s. | q.s. |
| Total weight (g) | 2.7 | 2.8 | 2.8 | 2.7 | 2.9 | 3.1 |

TABLE 2

| Components | Example No. | | | | | |
|---|---|---|---|---|---|---|
| (wt. %) | 7 | 8 | 9 | 10 | 11 | 12 |
| Oligosaccharides | 60 | 49 | 69 | 64 | 38 | 77 |
| Lactulose | 58 | 48 | — | — | — | — |
| Lactosucrose | — | — | 38 | 35 | — | — |
| Xylooligosaccharide | — | — | — | — | 36 | — |
| Soybean oligosaccharide | — | — | — | — | — | 10 |
| Neutralizing component | | | | | | |
| L-ascorbic acid | 3 | 2 | 2 | 3 | 4 | 2 |
| Anhydrous citric acid | 1 | 2 | 2 | 1 | 1 | 1 |
| Foaming component | | | | | | |
| Sodium hydrogencarbonate | 1 | 1 | 2 | 1 | 2 | 1 |
| Sodium carbonate | — | 1 | — | — | — | — |
| Calcium carbonate | — | — | — | — | — | — |
| Sucrose fatty acid ester | 1 | 1 | 1 | 1 | 1 | 1 |
| Powdered sugar | 15 | 18 | 9 | 12 | 30 | 3 |
| Water-insoluble dietary fiber | | | | | | |
| Crystalline cellulose | 14 | 19 | 10 | 10 | 17 | 7 |
| Fruit juice powder | 3 | 5 | 3 | 6 | 5 | 6 |
| Potassium carbonate | 0.2 | 0.2 | 0.3 | 0.2 | 0.3 | 0.2 |
| Flavor | q.s. | q.s. | q.s. | q.s. | q.s. | q.s. |
| Total weight (g) | 3.0 | 3.1 | 2.9 | 2.8 | 2.8 | 2.9 |

TABLE 3

| Components | Example No. | | | | | |
|---|---|---|---|---|---|---|
| (wt. %) | 13 | 14 | 15 | 16 | 17 | 18 |
| Oligosaccharides | 42 | 35 | 57 | 72 | 30 | 70 |
| Isomaltooligosaccharide | 36 | — | — | — | — | — |
| Galactooligosaccharide | — | 25 | — | — | — | — |
| Fructooligosaccharide | — | — | 54 | — | — | — |
| Paratinose oligosaccharide | — | — | — | 32 | — | — |
| Lactulose | — | — | — | — | 29 | — |
| Lactosucrose | — | — | — | — | — | 39 |
| Neutralizing component | | | | | | |
| L-ascorbic acid | 8 | — | 12 | 6 | 7 | 3 |
| Anhydrous citric acid | — | 5 | — | 3 | 6 | 1 |
| Foaming component | | | | | | |
| Sodium hydrogencarbonate | 4 | 3 | 7 | 5 | 10 | 2 |
| Sodium carbonate | — | 1 | — | — | — | — |
| Sucrose fatty acid ester | — | — | — | 3 | — | 2 |
| Powdered sugar | 30 | 42 | 8 | 5 | 26 | 12 |
| Water-insoluble dietary fiber | | | | | | |
| Crystalline cellulose | 15 | 13 | 15 | 5 | 20 | 9 |
| Potassium carbonate | 0.5 | 0.4 | 0.6 | 0.5 | 0.4 | 0.1 |
| Flavor | q.s. | q.s. | q.s. | q.s. | q.s. | q.s. |
| Total weight (g) | 2.7 | 3.0 | 2.9 | 2.5 | 2.3 | 2.6 |

TABLE 4

| Components | Example No. | | |
|---|---|---|---|
| (wt.%) | 19 | 20 | 21 |
| Oligosaccharides | 80 | 43 | 80 |
| Lactulose | 78 | 42 | — |
| Lactosucrose | — | — | 44 |
| Neutralizing component | | | |
| L-ascorbic acid | — | 30 | 0.9 |
| Anhydrous citric acid | 0.9 | — | — |
| Foaming component | | | |
| Sodium hydrogencarbonate | 0.3 | 7 | 0.3 |

TABLE 4-continued

| Components | Example No. | | |
|---|---|---|---|
| (wt.%) | 19 | 20 | 21 |
| Sodium carbonate | — | — | — |
| Water-insoluble dietary fiber | | | |
| Crystalline cellulose | 19 | 20 | 19 |
| Total weight (g) | 3.0 | 3.0 | 2.7 |

Text Example 1 Texture Test

A preparation of the invention having the composition shown in Table 5 below was prepared in a manner similar to the above Examples. As a comparative preparation, tablets not containing the foaming component was prepared in a similar manner. A comparative test was carried out by ten panelists to evaluate the texture of these samples in the mouth.

The evaluation was made based on the following criteria and the results are shown in Table 5.
1 . . . Does not stick to teeth
2 . . . Slightly sticks to teeth
3 . . . Sticks to teeth

TABLE 5

| | Composition of the invention | Comparative composition |
|---|---|---|
| Components (mg) | | |
| Lactosucrose | 2000 | 2000 |
| L-ascorbic acid | 430 | — |
| Sodium hydrogencarbonate | 200 | — |
| Total weight | 2630 | 2000 |
| Texture evaluation (number of people) | | |
| 1 | 7 | 0 |
| 2 | 3 | 3 |
| 3 | 0 | 7 |
| Overall result | Does not stick to teeth | Sticks to teeth |

Test Example 2 Texture test

A preparation of the invention having the composition shown in Table 6 below was prepared in a manner similar to the above Examples. As a comparative preparation, tablets not containing the foaming component were prepared in a similar manner. A comparative test was carried out by ten panelists to evaluate the texture of these samples in the mouth.

The evaluation was made in the same manner as in Test Example 1 and the result are shown in Table 6.

TABLE 6

| | Composition of the invention | Comparative composition |
|---|---|---|
| Components (mg) | | |
| Isomaltooligosaccharide | 1500 | 1500 |
| Sucrose fatty acid ester | 40 | 40 |
| Crystalline cellulose | 400 | 400 |
| L-ascorbic acid | 120 | 60 |
| Sodium hydrogencarbonate | 30 | — |
| Potassium carbonate | 3 | — |

TABLE 6-continued

|  | Composition of the invention | Comparative composition |
|---|---|---|
| Total weight | 2093 | 2000 |
| Texture evaluation (number of people) | | |
| 1 | 8 | 0 |
| 2 | 2 | 4 |
| 3 | 0 | 6 |
| Overall result | Does not stick to teeth | Sticks to teeth |

INDUSTRIAL APPLICABILITY

The present invention provides an oligosaccharide-supplying preparation in the form of foaming chewable tablets, which is highly useful in practice, has a uniform composition, excellent texture and high stability and can be easily ingested or administered.

What is claimed is:

1. An oligosaccharide-supplying composition comprising 10 to 80% by weight of oligosaccharide, 0.3 to 10% by weight of a foaming component and 0.9 to 30% by weight of a neutralizing component and being in the form of foaming chewable tablets.

2. The composition according to claim 1 which further comprises 0.1 to 5 wt. % of potassium carbonate as a stabilizer.

3. The composition according to claim 1 or 2 which further comprises 5 to 20 wt. % of water-insoluble dietary fiber.

4. The composition according to any one of claims 1 to 3 wherein the oligosaccharide is lactosucrose.

5. The composition according to claim 1 which has an oligosaccharide content of 30 to 75 wt. %.

6. The composition according to claim 1 wherein the oligosaccharide is at least one member selected from the group consisting of lactosucrose, palatinose oligosaccharide, isomaltooligosaccharide, xylooligosaccharide, fructooligosaccharide, lactulose, galactooligosaccharide, gentiooligosaccharide, chitin oligosaccharide, soybean oligosaccharide, panose, cellooligosaccharide, pectin oligosaccharide, inulooligosaccharide, levanoligosaccharide, mannooligosaccharide, chitooligosaccharide and coupling sugar.

7. The composition according to claim 1 wherein the oligosaccharide is at least one member selected from the group consisting of lactosucrose, palatinose oligosaccharide, isomaltooligosaccharide, xylooligosaccharide, fructooligosaccharide, lactulose, galactooligosaccharide and soybean oligosaccharide.

8. The composition according to claim 1 wherein the foaming component is at least one member selected from the group consisting of sodium hydrogencarbonate, sodium carbonate and calcium carbonate.

9. The composition according to claim 1 wherein the neutralizing component is at least one member selected from the group consisting of citric acid, L-tartaric acid, L-ascorbic acid and DL-malic acid.

10. The composition according to claim 1 wherein the neutralizing component is at least one member selected from the group consisting of L-ascorbic acid and anhydrous citric acid.

11. The composition according to claim 1 wherein the water-insoluble dietary fiber is at least one member selected from the group consisting of crystalline cellulose, wheat bran, oat bran, cone fiber, soy fiber and beet fiber.

12. The composition according to claim 1 wherein the water-insoluble dietary fiber is crystalline cellulose.

13. The method for improving the texture of an oligosaccharide-supplying preparation, which prevents the oligosaccharide-supplying preparation from sticking to teeth during ingestion, the method comprising mixing 0.3 to 10 wt. % of a foaming component and 0.9 to 30 wt. % of a neutralizing component with 10 to 80 wt. % of oligosaccharide and forming the composition into foaming chewable tablets.

* * * * *